UNITED STATES PATENT OFFICE.

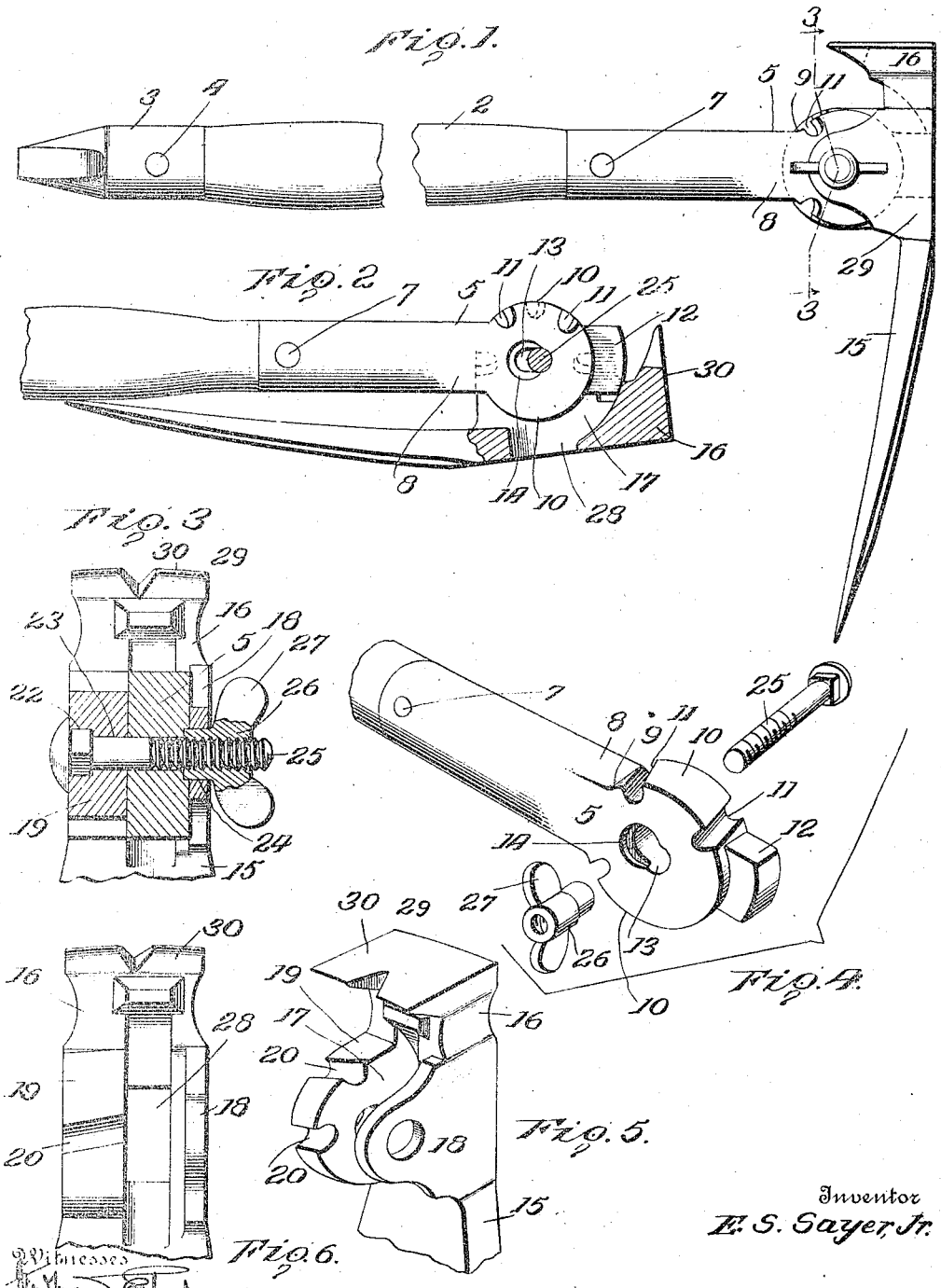

EDMUND S. SAYER, JR., OF NEW YORK, N. Y.

FOLDABLE MATTOCK.

1,066,155.	Specification of Letters Patent.	Patented July 1, 1913.

Application filed July 27, 1912. Serial No. 711,857.

*To all whom it may concern:*

Be it known that I, EDMUND S. SAYER, Jr., a citizen of the United States, residing at New York, in the county of New York and State of New York, have invented certain new and useful Improvements in Foldable Mattocks, of which the following is a specification.

My invention relates to tools, and particularly to picks, mattocks or like implements.

The main object of the invention is the provision of an implement designed for the use of campers, prospectors, soldiers, engineering parties, etc., wherein there is combined in one implement a mattock, hammer, spike puller and wire cutter.

A further object is to provide a mattock or like implement wherein the blade may be folded or turned so as to bring the blade into parallel relation to the handle, thus rendering the implement much easier packed or carried.

A further object is to provide a mattock or like implement constructed as above suggested, and provided with means whereby a very firm connection may be secured between the blade and the handle when the blade is in its working position.

A further object is to provide an implement of the character described, so simply constructed that it may be readily taken apart in order to repair or replace the several parts.

My improved implement is illustrated in the accompanying drawings wherein:

Figure 1 is a side elevation of a mattock-like implement constructed in accordance with my invention. Fig. 2 is a fragmentary side elevation with the blade or tool turned parallel to the handle, the head of the blade being shown in section. Fig. 3 is a fragmentary vertical section enlarged on the line 3—3 of Fig. 1. Fig. 4 is a perspective detail view of the handle head and the bolt nut. Fig. 5 is a perspective view of the tool or blade head, this figure also showing a portion of the blade. Fig. 6 is a fragmentary elevation looking at the rear face of the blade head.

Referring to these drawings, it will be seen that the implement includes a handle 2 which is preferably of hard wood and which may have any convenient shape or form. The end of the handle opposite the head is preferably provided with a steel chisel-shaped member 3 shown as formed with a socket embracing the extremity of the handle, this member being held in place by means of a rivet 4 or in any other convenient or suitable manner. The other extremity of the handle carries a steel head 5 having the form shown in Fig. 4 and formed with a socket into which the handle is inserted and held in place by means of a rivet 7. The handle may be otherwise attached, however, if found convenient. The socket and the steel head are preferably made in one integral piece. The head beyond the haft is formed to provide a flat sided shank 8 which is off-set from the haft, and the end of the haft portion on one side of the off-set shank is concavely rounded as at 9. The side edges of the head are rounded as at 10 and formed with inclined transversely extending wire receiving grooves 11 which form wire cutting means. The extremity of the shank 8 is extended to form a "plug" 12 rectangular in cross section. The shank 8 is transversely slotted as at 13, the slot extending longitudinally of the shank and having rounded ends. One side of the shank has a circular recess 14 which is concentric with the curved inner end of slot 13. The blade 15 is similar in shape to the blade of a mattock, and is formed integral with a blade head 16 less in width than the blade proper. The blade and blade head are of course made of tool steel. The head is formed with a socket 17 on its inner face having the same width as the shank 8 and having an approximately concavely rounded inner face. The walls of the socket are upwardly extended to form oppositely disposed parallel ears 18 and 19. As shown, the ear 18 is smaller than the ear 19. The ear 19 is formed on its edge with a plurality of notches 20 adapted to aline with the notches 11 formed on the shank 8. The notches 20 in conjunction with the inclined grooves or notches 11 form wire cutting means. The ear 19 is formed on its side face with a many-sided recess 22, and also with a transversely extending bolt passage 23. The ear 18 is formed with a transversely extending bolt passage 24 larger than the passage 23.

The shank 8 is adapted to be inserted in the socket formed in the tool head with the ears 18 and 19 on each side of the shank and the passages 23 and 24 alining with the slot 13. A pivot bolt 25 passes through the passage 23 and into the passage 24, the head of the bolt being received in the socket 22. The bolt passes through the slot 13 of the shank 8 and is engaged by a nut 26, the exterior diameter of which corresponds to the diameter of the passage 24. This nut 26 is provided with wings 27 whereby the nut may be turned. The nut is held in place in any convenient manner.

It is to be particularly noted from Fig. 2 that the recess 17 formed in the inner face of the tool head is connected by a passage 28 with the exterior face of the tool head. This passage 28 has the same shape as the plug 12 and is designed to receive said plug when the parts are in the position shown in Fig. 1.

It will be seen from Fig. 5 that the end of the head is solid as at 29 to form a hammer and that this hammer extends rearward and is notched at 30 to provide a nail or spike gripping notch whereby a nail or spike may be withdrawn.

With the construction above described, when it is desired to fold the blade down parallel to the handle 2, the nut 26 is loosened and the tool head shifted outward relative to the handle head so that the bolt 25 is at the outer extremity of the slot 13. In this position as shown in full lines in Fig. 2, the plug 12 is withdrawn from engagement with the passage 28 which connects the socket 17 with the outer face of the tool head, thereby permitting the blade and tool head to be rotated to any desired position. When, however, it is desired to use the tool as a mattock or for like purposes, the nut 26 is loosened and the tool head is shifted inward relative to the shaft 8 until the plug 12 projects through the passage 28, this passage 28 of course fitting the plug so as to engage it firmly. When so shifted, the nut is again tightened and the nut in this case seats within the recess 14, thus holding the parts securely in position and preventing any longitudinal shifting of the head relative to the handle.

When it is desired to use the tool as a wire-cutting device, the nut is loosened to a sufficient degree to permit the tool head to be shifted outward, thus freeing the plug 12 from its engagement with the passage 28, and in this position the tool head may be rotated relative to the shank so as to cause the notch 20 to move across the ends of the grooves 11. A wire inserted through the notch 20 and through the corresponding groove 11 will of course be cut by the wall of the notch 20 as the head is rotated.

Inasmuch as the blade is provided with the hammer head 29, the tool may be used as a hammer when necessary, and as this hammer head 29 is provided with the spike or nail engaging notch 30, the device may also be used for withdrawing spikes or nails. The chisel-shaped shoe 3 carried by the lower end of the hammer is designed to be used for prying up stones, loosening hard ground, etc.

It will be obvious that a tool as above described is extremely convenient, very compact and portable, simple to use, may be readily manufactured, and that if any part breaks, it may be readily replaced. Furthermore it is adapted to a large variety of uses and forms a tool particularly handy to campers, prospectors, and in all situations wherein the weight of a kit to be carried is an important feature.

While I have shown what I believe to be the most effective form of the implement, yet it will be understood that many changes in minor details might be made without departing from the spirit of the invention.

What I claim is:

1. A mattock like implement including a handle and a blade, one having a socket and the other a flat sided projection adapted to extend into the socket, the blade being pivotally connected to the handle for rotation in a plane parallel to the handle and being shiftable longitudinally relative to the handle to engage or disengage said projection from the socket, and means for clamping the blade upon the handle.

2. A mattock like implement including a handle and a blade, one being slotted and the other formed with a perforation, the blade being formed with a socket to receive the adjacent extremity of the handle whereby to engage the blade with the handle from rotative movement in any direction, a bolt passing through the slot and perforation whereby to pivotally connect the blade to the handle for rotation in a plane parallel to the handle, said slot permitting the blade to shift longitudinally to carry its socket into or out of interlocking engagement with the extremity of the handle, and means on said bolt for clamping the blade in an adjusted position.

3. A mattock-like implement including a handle having a head provided with a shank, and a blade having a head formed with a socket for the reception of the shank, said socket having an extension to receive the extreme end of the shank, the blade and head being rotatably mounted on the shank and longitudinally movable with relation thereto to engage or disengage the extension of the socket from the shank.

4. A mattock-like implement including a handle having a head provided with a shank, and a blade having a head formed with a socket for the reception of the shank and said socket having an extension to receive the end of the shank, a bolt passing through the head and through a longitudinal slot in the shank, the blade and attached head being thereby rotatably mounted on the shank and longitudinally movable relative thereto to engage or disengage the end of the shank from the extension of the socket.

5. A mattock-like implement including a handle having a head provided with a shank reduced in width and a blade having a head formed with a socket having opposite sides fitting the sides of the shank, said socket having an extension opening through the head receiving and fitting the extremity of the shank, a bolt passing through the head and through a slot in the shank, and a nut on said bolt passing through the head and engaging the side of the shank.

6. A mattock-like implement including a handle having a head provided with a relatively narrow flat sided shank, said shank being longitudinally slotted, the slot having rounded ends, one face of the shank being formed with a nut-receiving recess concentric to the rounded end of the slot, and a blade having a head formed with a socket for the reception of the shank, one wall of the socket having a bolt passage, the opposite wall being formed with a nut-receiving passage, the rear wall of the socket being formed with an extension adapted to receive and snugly fit the extremity of the shank, a bolt passing through the head and through the slot in the shank, and a nut engaging the bolt adapted to fit the recess in the face of the shank.

7. A mattock-like implement of the character described, including a handle having a head provided with a shank reduced in thickness, and a blade having a head formed with parallel projecting ears defining a shank-receiving socket, the shank being longitudinally slotted and the ears provided, each with a bolt-receiving passage, and a nut engaging the bolt operating through one of said passages and engaging the side face of the shank.

8. A mattock-like implement including a handle having a head provided with a longitudinally slotted shank, and a blade provided with a head having a socket to receive the shank, said socket having an extension to receive the extremity of the shank when the head is shifted longitudinally toward the handle, a bolt passing through the head and shank, a nut on the bolt, and means for preventing longitudinal movement of the head relative to the shank when the shank is engaged in the extension of the socket and when the nut is screwed home.

In testimony whereof I affix my signature in presence of two witnesses.

EDMUND S. SAYER, Jr. [L. s.]

Witnesses:
MURRAY SAYER,
F. A. MERRIAM.